Jan. 11, 1944.  W. ARMSTRONG  2,339,043
FEEDING APPARATUS
Filed Nov. 7, 1940  6 Sheets-Sheet 3

Inventor:
Westropp Armstrong
By:
Brown, Jackson, Boettcher & Dienner
Attys.

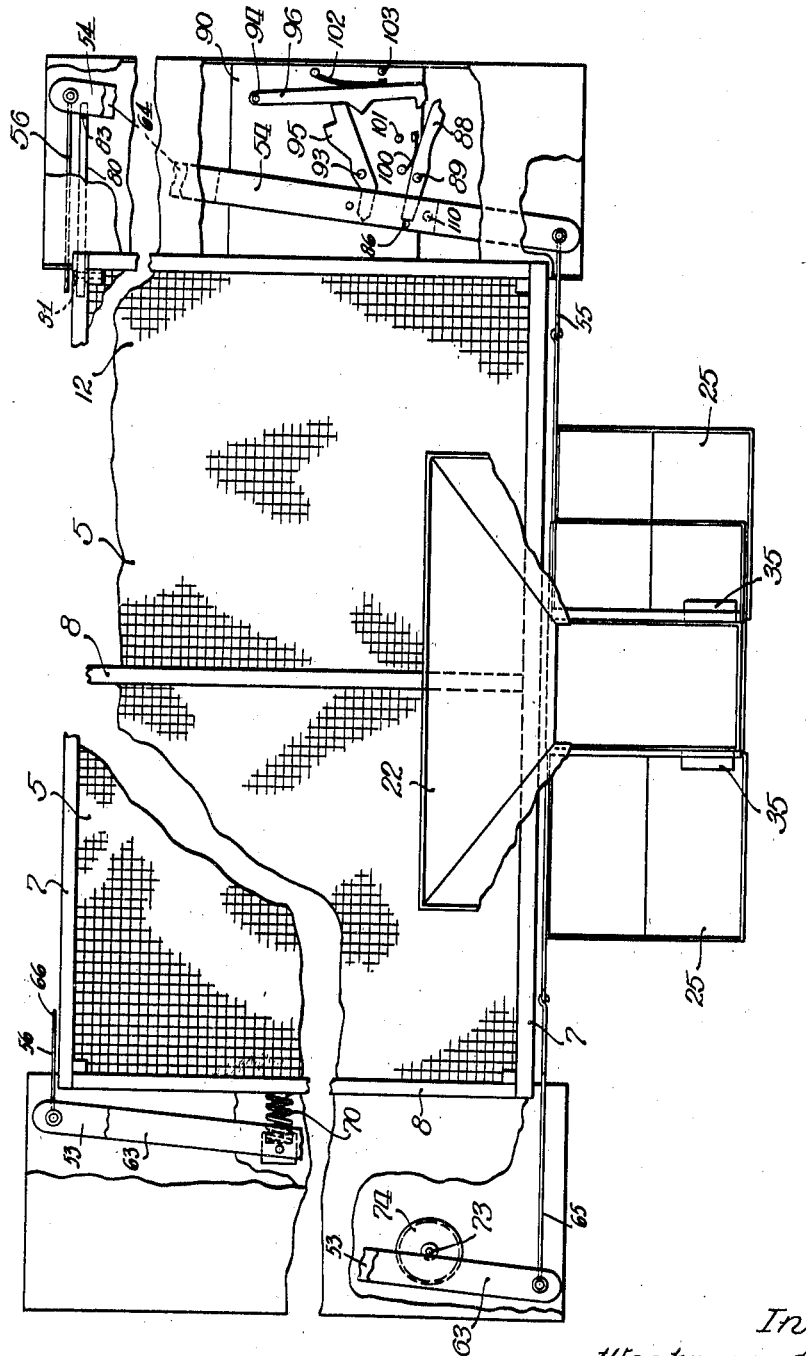

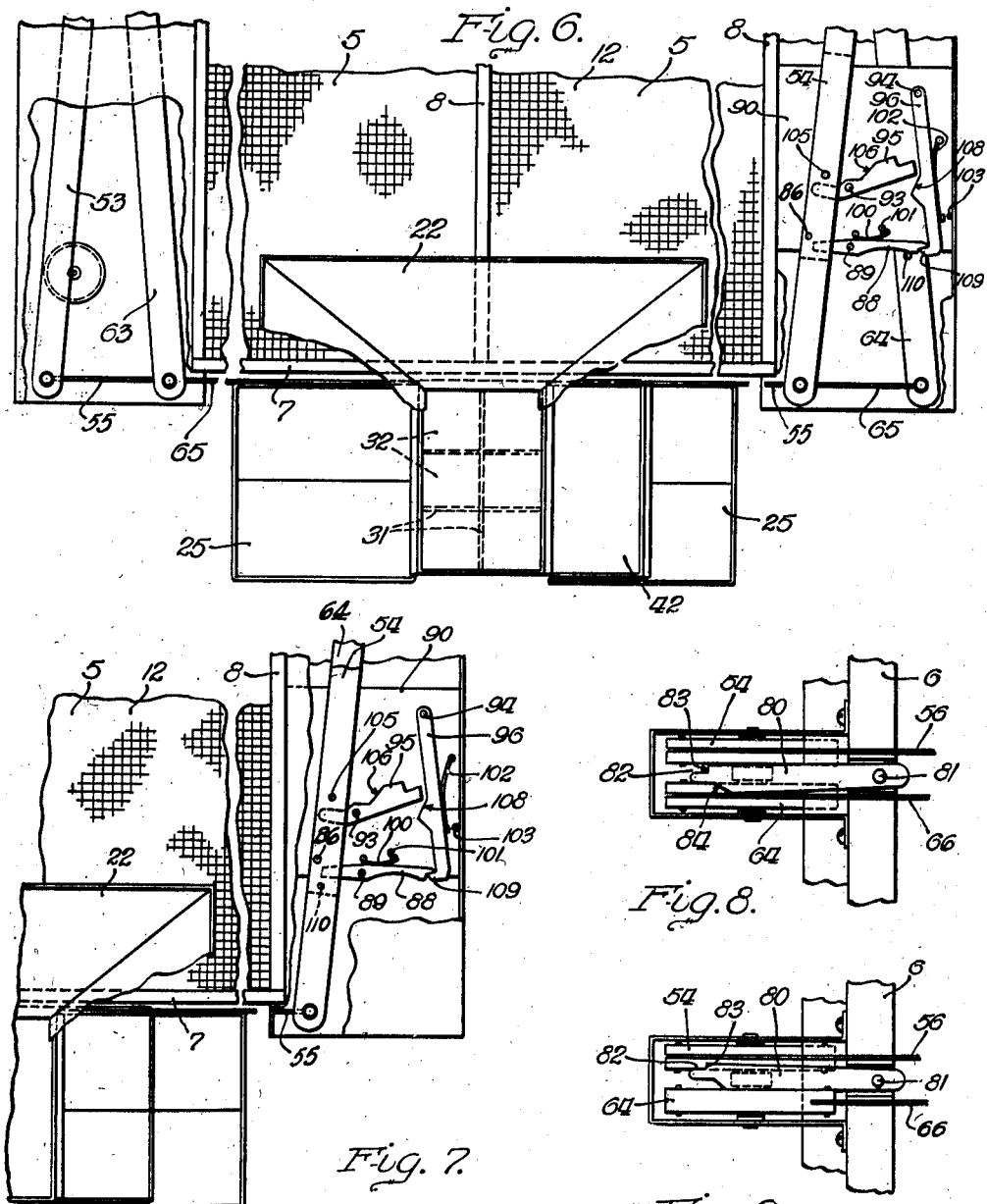

Jan. 11, 1944. W. ARMSTRONG 2,339,043
FEEDING APPARATUS
Filed Nov. 7, 1940 6 Sheets-Sheet 6
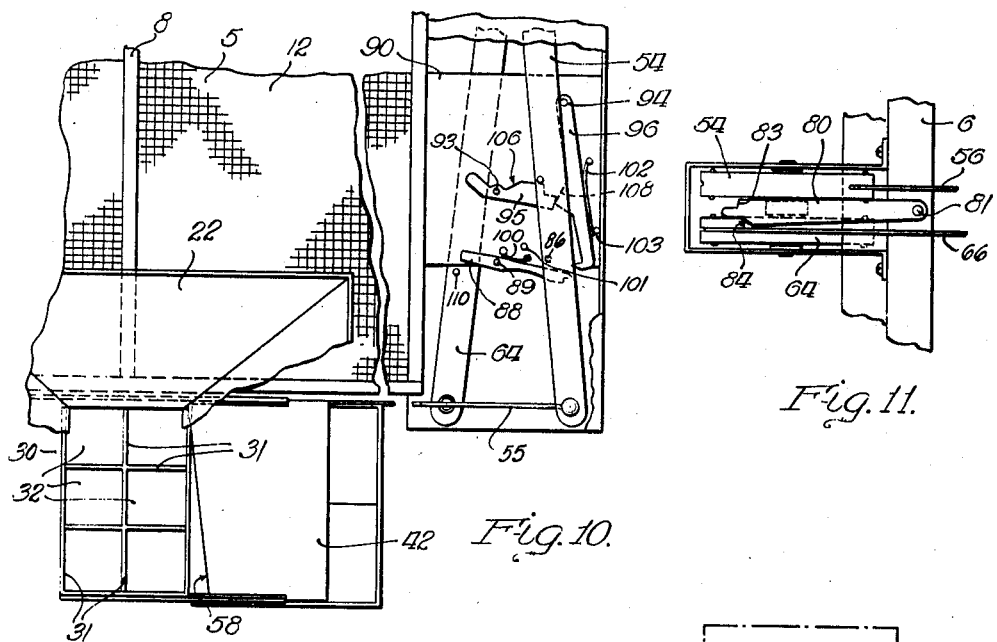
Fig. 10.
Fig. 11.
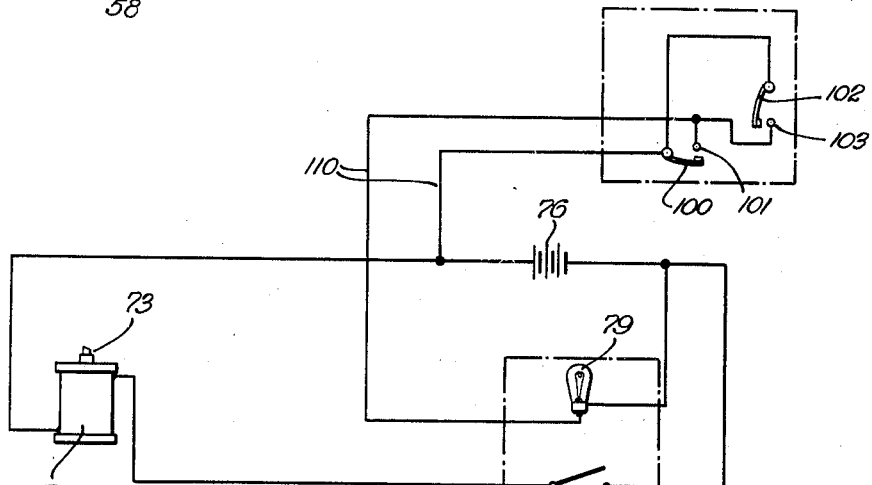
Fig. 12.
Inventor:
Westropp Armstrong
By: Brown, Jackson, Boettcher & Dienner
Attys.

Patented Jan. 11, 1944

2,339,043

UNITED STATES PATENT OFFICE 2,339,043

FEEDING APPARATUS

Westropp Armstrong, Glen Ellyn, Ill.

Application November 7, 1940, Serial No. 364,627

17 Claims. (Cl. 119—18)

This invention relates to feeding apparatus, and has to do particularly with apparatus for storing, measuring, and controlling the delivery of feed for laying hens and the like.

One of the main objects of the present invention is to provide an improved form of apparatus for storing a quantity of feed and for accurately measuring and delivering given amounts of feed at given or predetermined times or at predetermined intervals to the feed troughs for the respective cages, and, particularly, to provide an improved form of apparatus of the character described which is adapted for use with a plurality of cages for individual hens, such, for example, as a battery of cages assembled in adjacent tiers of superposed cages with an individual feed trough for each cage.

It is one of the more specific objects of the invention to provide an improved form of feed chute and an improved arrangement of the same with respect to the feed troughs with which it is associated.

Another object of the invention is to provide an improved form of measuring means for accurately measuring the desired quantities of feed, and means operable as a unit from remote position or from any other position and, automatically or otherwise as desired at the given or predetermined times or predetermined intervals, to deliver the measured amounts of feed to the respective troughs.

Another object of the invention is to provide means for preventing the delivery of the feed from the feed measuring means to the respective troughs during the operation of measuring the given amounts of feed and until completion of the feed measuring operation, and for preventing the delivery of feed to the measuring means when the apparatus is set for the delivery of the feed from the measuring means to the respective troughs and until the apparatus is set to shut off the delivery of feed from the measuring means to the feed troughs.

Another object of the invention is to provide apparatus of the class described which is adapted for use with a battery of cages having cages on opposite or different sides and in which the measuring and delivery control devices are interconnected for simultaneous operation.

Another object of the invention is to provide in apparatus of the class described signal means which is rendered operative to indicate that the hens are fed when the apparatus is set for the delivery of feed to the respective troughs and which signal means is rendered inoperative when the apparatus is set for the further measurement of the feed.

It is a further object of the invention to provide apparatus of the character described which is of simple and relatively inexpensive construction and which will operate effectively for the purposes set forth; also apparatus of the character described which will provide economy of space and convenience in operation, and convenience in attending to the apparatus and to the hens.

Further objects and advantages of the invention will be apparent from the following detailed description, taken in connection with the accompanying drawings in which:

Figure 5 is a fragmentary top plan view on a somewhat enlarged scale showing the interconnections between the measuring and delivery control devices on opposite or different sides of the battery of cages, with the parts positioned as they are after completion of the measuring operation and before delivery of the measured amounts of feed to the troughs;

Figure 6 is a view similar to Figure 5 showing the positions of the parts after delivery of the measured amounts of feed to the troughs;

Figure 7 is a view similar to the right hand side of Figure 6, showing a further position of the parts;

Figure 8 is a fragmentary view showing the interlock means for preventing opening of the upper slides when the lower slides are open;

Figure 9 is a fragmentary view similar to Figure 8, showing the interlock means in another position;

Figure 10 is a fragmentary view similar to Figure 7, showing the parts in another position;

Figure 11 is a fragmentary view similar to Figure 8 showing the interlock means in a further position; and Figure 12 is a circuit diagram.

Figure 2:
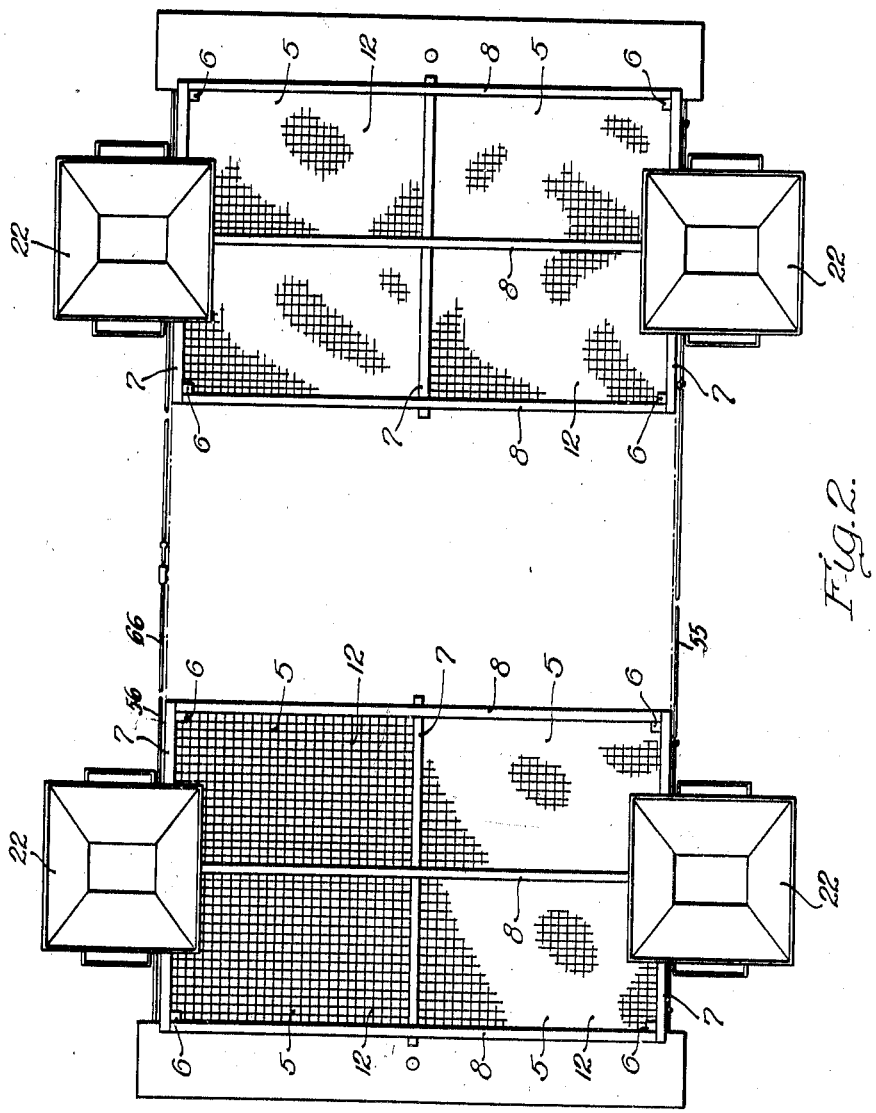
Figure 2 is a top plan view of the apparatus shown in Figure 1.

Referring now to the drawings, in the particular embodiment of the invention selected for illustration, the cage structure comprises a battery of cages, which battery consists of a plurality of adjacent tiers of superposed cages 5. The cages of the adjacent tiers are arranged in horizontal rows, there being a plurality of front rows at different elevations at the front of the battery and a plurality of rear rows at different elevations at the rear, as shown in Figure 2.

Figure 1:
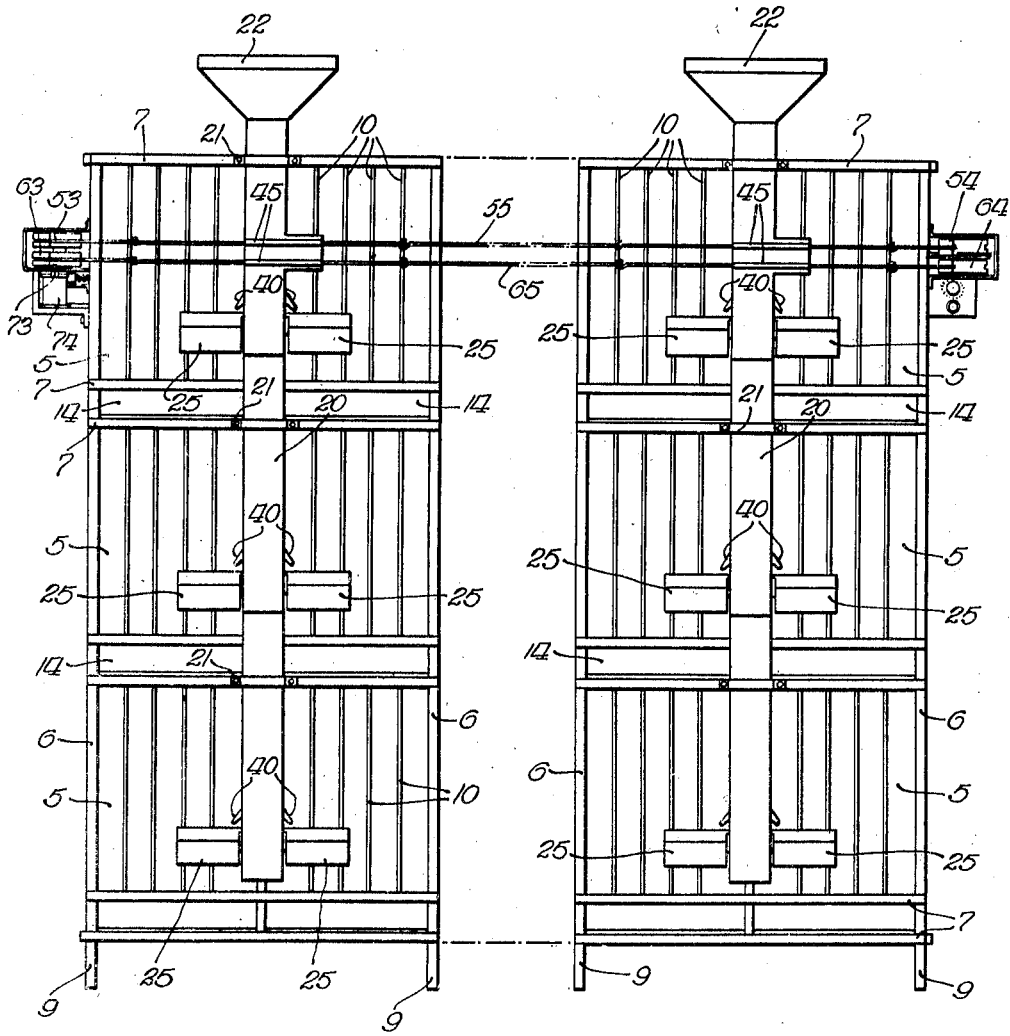
Figure 1 is a more or less diagrammatic front elevation of a hen battery showing the present invention applied thereto.

The cage structure has upright frame members 6 interconnected horizontally by longitudinal rails 7 and transverse rails 8 to form the framework for the respective individual cages. The upright frame members 6 extend downwardly and act as legs at 9 as shown in Figure 1 to support the structure above the floor. Additional sections comprising additional frames may be bolted or otherwise secured to the framework of the original structure to provide any desired number of additional cages. The particular construction of the hen battery selected for illustration may be varied widely within the scope of the present invention.

Each individual front cage 5 is closed at the front by vertical rods 10 suitably spaced so that the hen may freely move its head and neck through the spaces between the rods for feeding purposes. Each individual rear cage 5 is closed at the rear by similar suitably spaced vertical rods 10. The sides, top, and bottom of the respective cages 5 are closed by wire mesh 12 commonly known as "hardware cloth," and pans may be provided between the bottom of each cage and the underlying cage. Spaces 14 may be provided between the superposed cages 5 of each tier through which the eggs may be withdrawn or discharged, although this, of course, may vary widely.

The feeding apparatus comprises a plurality of vertically extending feed supply chutes 20, there being one chute 20 for each pair of adjacent tiers of front cages and one similar chute 20 for each pair of adjacent tiers of rear cages. The chutes 20 may be fastened to the framework by brackets 21, and each chute extends vertically along the upright dividing walls between the cages of the two tiers with which it is associated. The top of each chute 20 is preferably provided with a suitable hopper 22.

The front of each front cage 5 and the rear of each rear cage 5 is provided with a feed trough 25. These feed troughs 25, which are arranged so that the hens may have access to the feed therein through the spaces between the vertical rods or wires 10, are arranged in horizontally disposed pairs at opposite sides of the chute 20 and with the pairs of troughs in vertically spaced relation. The troughs 25 are preferably detachably secured to the opposite sides of the chute 20 at the desired locations. One suitable form of attachment comprises a strip 26 secured to the side of the chute 20 and spaced therefrom between its places of attachment to the chute, and a downturned flange 27 secured to the side of the trough and adapted to be slipped into place between the strip 26 and the side of the chute detachably to mount the trough on the chute. The flange 27 may be a part of an inverted U-shaped bracket having its other leg 28 soldered or otherwise suitably secured to the adjacent side of the trough 25.

Each chute 20 has a feed measuring portion at 30 which is divided by partitions 31 into a plurality of individual measuring compartments 32, one for each trough 25. In the illustrated embodiment of the invention, each chute 20 supplies feed to six feed troughs 25, but, of course, this may vary. Therefore, in the embodiment of the invention selected for illustration, the measuring portion at 30 is divided into six individual measuring compartments 32. These compartments 32 are shown as of generally square form which may vary, and they are shown with the two compartments for each pair of feed troughs disposed longitudinally of each other and with the three compartments for the superposed cages in each tier disposed transversely of the apparatus, or from front to rear as the apparatus is viewed in Figures 1 and 2.

Each chute 20 is preferably divided below the measuring portion 30 by internal vertical partitions into individual feed chutes 34, one disposed below each measuring compartment 32 and adapted for receiving its measured amount of feed from its associated measuring compartment 32. This may be varied within the broader aspects of the invention. As shown in Figures 1 and 2, the lower ends of the two outer individual chutes 34 of each main chute 20 have feed outlets 35 which, above the upper troughs 25, open out from the chute 20 in opposite directions, one to each of these troughs for delivering the measured amounts of feed thereto. The next two inwardly disposed individual chutes 34 extend downwardly beyond the lower ends of the outer individual chutes, and have feed outlets 36 which, above the next lower pair of feed troughs 25, open out from the chute 20 in opposite directions, one to each of these troughs 25 for delivering the measured amounts of feed thereto. The inner individual chutes 34, as the apparatus is viewed in Figures 1 and 3, extend downwardly beyond the lower ends of the intermediate individual chutes, and have feed outlets 38 which, above the bottom pair of feed troughs 25, open out in opposite directions from the chute 20, one to each of these troughs 25 for the delivery of the measured amounts of feed thereto.

From the foregoing description of the feed chute, it will be apparent that the number of outlets 35, 36, and 38 is equal to the number of feed troughs 25 supplied with feed by the chute 20, and that the horizontal section of the column of feed for each outlet is substantially equal throughout its height. As a result, the flow of feed to the respective outlets is wholly unrestricted by the weight or pressure of the feed above the outlets, as distinguished from a chute of varying cross section in which the flow to the outlets would be restricted by components of the weight or pressure of the feed acting downwardly. In other words, the storage compartment and individual chutes are parallel sided throughout their length, and, as a result, there is no packing of the feed such as would result in impairment of its flow to the outlets.

At the top of the chute 20 above the upper outlets 35, the horizontal area of the chute is substantially equal to the combined areas of the six outlets, whereas below the upper outlets 35 the area is substantially equal to the combined areas of the four outlets below such position. Below the vertically intermediate outlets 36 the area of the chute is substantially equal to the combined areas of the two bottom outlets 38. This assures effective distribution of the feed without interruption or impairment of the flow due to packing or the like. Each feed outlet may be provided with a spout 40 or the like (Figure 4) for assuring proper delivery of the feed to the respective troughs 25.

Figures 3, 4:
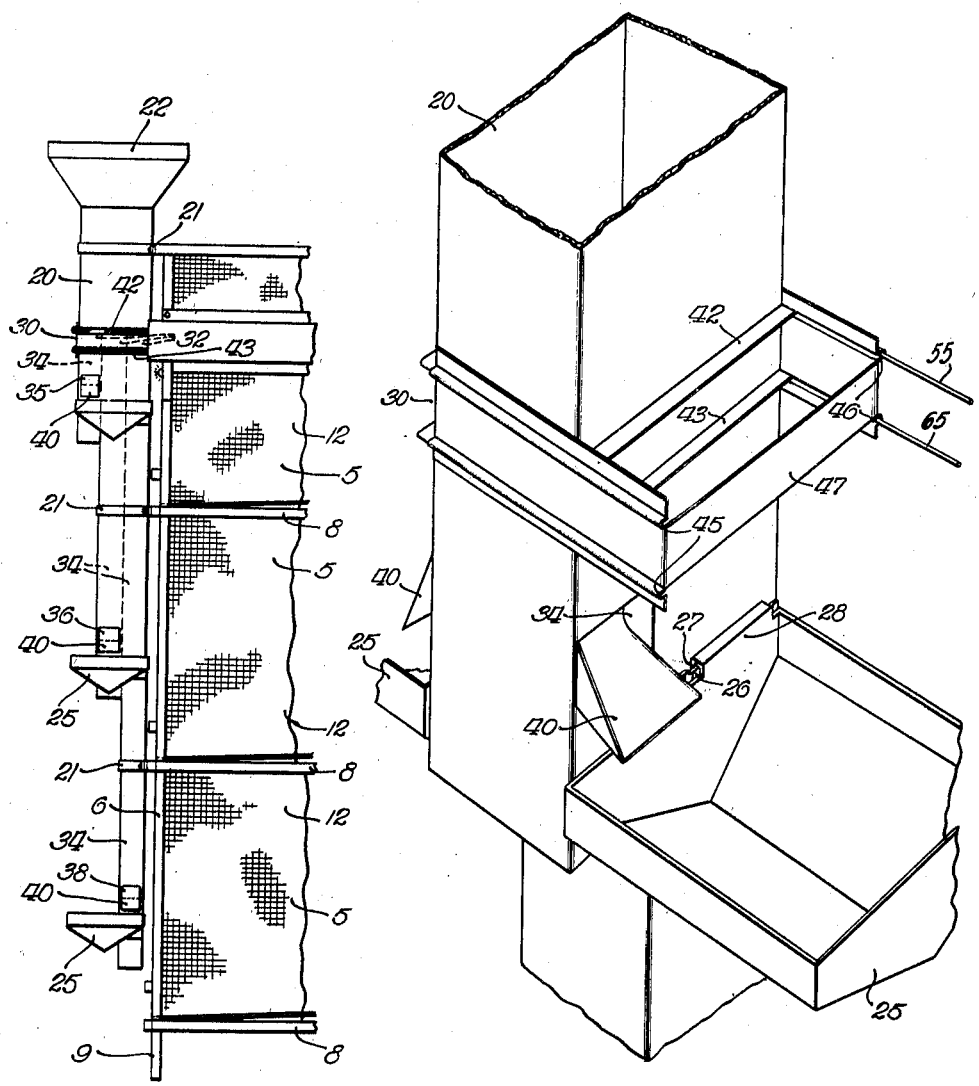
Figure 3 is a fragmentary view taken at right angles to Figure 1 and showing one of the feed chutes and the measuring and delivery control means associated therewith; also, the vertically spaced feed troughs which are supplied with feed from one side of the chute.
Figure 4 is a fragmentary perspective view of the feed chute showing the measuring and delivery control means and one pair of horizontally spaced feed troughs which receive their measured supplies of feed from the chute.

Mounted for sliding movement above the measuring compartments 32 of the measuring portion 30 of each chute 20 is a first or top slide 42 having a closed position covering the top of the measuring compartments to shut off the delivery of feed thereto and slidable to open position uncovering the measuring compartments for the delivery of feed to these compartments from the storage portion of the chute 20 overlying the measuring portion 30. Mounted for sliding movement below the measuring compartments 32 is a second or bottom slide 43 having a closed position closing the bottoms of the measuring compartments to shut off the delivery of feed to the respective troughs 25 and slidable to open position uncovering the bottoms of the compartments 32 for the delivery of the measured amounts of feed to the respective feed troughs. The slides 42 and 43 are guided for sliding movement in grooves 45 and 46, respectively, in the front and back sides of the measuring portion 30 of the chute 20, which front and back sides of the measuring portion 30 extend from one side of the chute 20 to allow for the desired movement of the slides 42 and 43. The extended front and back sides of the measuring portion 30 may be connected at 47 (Figure 4).

Pivoted at opposite ends of the battery of cages at 50 and 52 (Figure 2) respectively are a pair of upper arms 53, 54, the forward ends of which are connected by jointed wires 55 or other suitable connections with the slides 42 at the front of the apparatus. The rear ends of the arms 53, 54 are similarly connected by wires 56 with the slides 42 at the rear of the apparatus as the same is viewed in Figures 1 and 2, thus interconnecting all of the upper slides for simultaneous movement to open and closed positions. The inner ends of the upper slides 42 are preferably beveled at 58 to facilitate cutting through the feed.

Pivoted at opposite ends of the apparatus beneath the arms 53 and 54 also at 50, 52, respectively, are a pair of arms 63, 64, the forward ends of which are connected by wires 65 or other suitable means with the lower slides 43 at the front of the apparatus. The rear ends of the arms 63, 64 are similarly connected by wires 66 with the slides 43 at the rear of the apparatus.

By grasping one of the upper arms 53, 54, for instance at the outer end thereof, and swinging the same in a clockwise direction (Figures 5 and 6), all of the upper slides 42 may at the proper time be shifted to closed position. Swinging movement of the arms 53, 54 in a counterclockwise direction moves all of the upper slides 42 to their open position. Swinging movement of the lower arms 63, 64 in a clockwise direction moves all of the lower slides to their closed position, and swinging movement in the opposite direction moves the lower slides 43 to their open position.

A spring 70 interposed, for example, between the arm 63 and the adjacent side of the apparatus or any other suitable abutment is adapted for swinging the lower arms 63, 64 in directions simultaneously to move the lower slides 43 to their open positions. For the purpose of restraining the spring 70 and thereby holding the lower slides 43 in their closed positions upon so shutting the apparatus, a latch 73 is provided adjacent the arm 63. The latch 73 constitutes a part of the armature of an electromagnet 74, energization of which electromagnet 74 releases the latch 73 from holding engagement with one side of the arm 63, whereupon the spring 70 actuates the lower slides 43 to their open position to deliver the measured amounts of feed to the respective troughs 25 through the individual chutes 34.

The electromagnet 74 is connected in circuit with a battery 76 or other suitable source of current (Figure 12). This circuit has a push button or other suitable switch 78 which, when the apparatus is set as will hereinafter appear, is adapted to be closed to energize the electromagnet 74 for the purpose of releasing the latch 73 for movement of the lower slides 43 to their open position under the action of the spring 70. The switch 78, which may be operated manually or by time controlled or other means (not shown) at the given or predetermined times or intervals, may be disposed adjacent the apparatus, or it may be disposed remote from the apparatus as, for example, in the house or dwelling or otherwise as desired. A signal lamp is preferably provided as shown diagrammatically at 79 (Figure 12) for indicating when the hens have been fed.

In order to prevent operation of the upper slides 42 to their open position when the lower slides 43 are open, and to prevent operation of the lower slides 43 to their open position when the slides 42 are open, interlock means is provided.

The interlock means for preventing opening of the upper slides 42 when the lower slides 43 are open comprises an arm 80 pivoted, for example, at 81 to the framework of the apparatus for swinging movement in a vertical direction. The upper edge of the arm 80 has a notch at 82 forming a shoulder at 83, and the lower edge of this arm 80 has a cam surface at 84. Upon movement of the lower slides 43 to their open position, the rear end of the arm 64 strikes the cam surface 84 of the arm 80 and lifts this arm to its raised position, in which position the shoulder 82 engages the arm 54 and locks this arm 54 against movement in the direction it must move as the upper slides 42 are moved to their open position. Upon resetting the lower slides 43 to their closed position, the rear end of the arm 64 swings out to position beneath the cam portion of the interlock arm or finger 80, permitting this arm to drop sufficiently to release the shoulder 82 from the arm 54 so that the upper slides 42 may be moved to open position.

For the purpose of locking the upper slides 42 to prevent opening thereof after completion of a measuring operation until the lower slides 43 have been opened to deliver the measured amounts of feed to the respective feed troughs 25, the arm 54 is shown as provided near its forward end with a depending pin 86 which is adapted for abutting engagement with the end of a lever 88 pivoted at 89. The manner in which the end of the lever 88 is set for cooperation with the pin 86 will be described more in detail as this description proceeds.

The lever 88 is pivoted on a flat base or support 90 adjacent the front ends of the arms 54, 64. Also pivoted on the base or support 90 at 93 and 94, respectively, are two further levers 95 and 96. Adjacent the lever 88 is a spring contact or switch arm 100 normally biased to open position and adapted to be pressed into engagement with a contact 101 by movement of the lever 88, as will presently appear. Adjacent the lever 96 is a contact or switch arm 102 normally biased to open position and adapted to be pressed into engagement with a contact 103 by movement of the lever 96, as will also presently appear.

Figure 7 shows the positions of the levers 88, 95, and 96 after movement of the lower slides 43 to their closed position and prior to operating the upper slides to deliver the feed to the measuring compartments 32. As the front end of the arm 54 is swung to the right from the position shown in Figure 7 to the position shown in Figure 10, to open the upper slides 42 for the delivery of feed to the measuring means, a pin or other abutment 105 on the arm 54 engages a cam surface 106 on the lever 95 and cams this lever 95 in a clockwise direction about its pivot 93, causing its outer end to engage a cam surface 108 on the lever 96 with a resulting counterclockwise movement of the lever 96 about its pivot 94. This releases the detent 109 on the lever 96 from the adjacent end of the lever 88, and this lever 88 is swung to the position shown in Figure 10 by the spring contact arm 100.

Upon swinging the forward end of the upper arm 54 to its left hand position as shown in Figure 5, to close the upper slides 42, the levers 88, 95, and 96 assume the positions shown in Figure 5. The accurately measured amounts of feed are now in the measuring compartments 32, and the further supply of feed to these measuring compartments from the portion of the chute 20 thereabove is shut off. The delivery of the measured amounts of feed from the measuring compartments to the feed troughs 25 is also shut off by the lower slides 43, and the device is set for the delivery of the measured amounts of feed to the respective troughs 25.

Then by closing the switch 78 to energize the electromagnet 74, the latch or detent 73 is released and the spring 70 operates the lower slides 43 to their open position, thereby delivering the accurately measured amounts of feed to the respective troughs 25. Figure 6 shows the positions of the arms 54, 64 at this time. With the arms 54, 64 thus positioned, the lever 88 presses the spring contact arm 100 into engagement with the contacts 101 thereby closing a circuit for a signal lamp 79 or other suitable signal shown in Figure 12. The signal 79 is thus lighted or rendered operative to indicate that the hens have been fed. It will be noted by reference to Figure 12 that the switches at 100 and 102 are connected in parallel circuit relation, and that lighting of the lamp 79 to indicate that the hens have been fed is accomplished when either one or both switches at 100 and 102 are closed.

With the arms 54, 64 positioned as shown in Figure 6, the interlock finger 80 is positioned as shown in Figure 9 to lock the upper arm 54 against movement of the upper slides 42 to their open position. This prevents the delivery of feed from the chute above the measuring device to the measuring compartments 32 with the lower slides 43 open, in which case the feed would pass unmeasured to the troughs 25.

The next step in the operation of the apparatus is to swing the outer end of the lower arm 64 from the position shown in Figure 6 to the position shown in Figure 10, to close the lower slides 43. The movement of the lower slides to closed position frees the upper arm 54 so that the outer end of this arm 54 may be swung to the right as shown in Figure 10, thus opening the upper slides for the delivery of feed to the measuring compartments 32. Then by moving the outer end of the arm 54 to its opposite position as shown in Figure 7, the upper slides 42 are closed, thus completing the feed measuring operation and setting the device for the delivery of the measured amounts of feed to the troughs 25 by closing the switch 78, as already described.

When the arm 64 is actuated from the position shown in Figure 5 to the position shown in Figure 6 to open the bottom slides 43 after first placing the measured amounts of feed in the compartments 32, the pin 110 carried by the arm 64 engages the lever 88 to operate it to close the switch at 100, 101, thereby lighting the light 79 to indicate that the hens have been fed. Upon closing the bottom slides 43 for the next measuring operation, as indicated in Figure 7, the switch at 100, 101 remains closed and the signal 79 continues to operate. Upon movement of the upper slides 42 to open position, the other switch is closed at 102, 103 before opening of the switch at 100, 101, and the light 79 continues to burn. Upon closing the upper slides to complete the measuring operation and with the lower slides closed, as indicated in Figure 5, both switches at 100, 101 and 102, 103 are opened, thereby turning off the lamp 79 to indicate that the device is set for the next delivery of feed to the troughs 25.

The sequence of operation of the mechanism above described will now be set forth:

Referring now to Figure 5, which shows the parts positioned after the measuring operation has been completed and before delivery of the measured amount of feed to the trough, it will be seen that the upper arm 54 directly overlies the lower arm 64 and that the spring contact arm 100 is forcing the detent end of lever 88 downwardly while positioning the other end of lever 88 against the pin 86 carried by the arm 54. Thus with the parts in this position it will be seen that the outer end of arm 54 is locked against movement to the right so that the upper slides 42 cannot be shifted laterally to their open position. The switch 78 may now be actuated to release the lower arm 63 which is then urged by the spring 70 to the right to open the lower slides 43 whereupon the measured amounts of feed are free to drop into the several individual passageways 34, the feed then being discharged through the several outlets 35 one into each feed trough 25. Now, when the outer end of the arm 64 has been shifted to the right as viewed in Figure 6, it will be seen that the contacts 101 are closed and the pin 110 carried by the arm 64 has positioned the lever 88 so that the end thereof, adjacent the detent 109, is retained in the position shown in Figure 6 by the lever 96. Thus the signal lamp is energized to indicate that the hens have been fed. With the arms 54 and 64 disposed in the position shown in Figure 6, the inner lock means comprising the lever 80 and associated elements, described more in detail above, locks the outer end of arm 54 against movement to the right. Thus, with the outer end of arm 64 disposed to the right in the position shown in Figure 6, the slides 43 are open and the upper arm 54 is positively locked against movement so that the slides 42 cannot be opened. In this position of the parts it is impossible for feed to pass directly from the hopper 22 through the measuring compartments and into the several passageways leading to the respective discharge outlets and feed troughs. Now, in order to again measure the feed for a subsequent feeding operation, the outer end of lever 63 must be pushed to the left to carry the outer end of arm 64 also to the left, as in Figure 7, in order to release the lever 80 from locking the outer end of arm 54 against movement to the right. However, the lever 88 is retained in the position shown by the detent 109 of the lever 96 so that the signal lamp continues to burn to indicate that the hens have been fed. With the lever 54 released for movement to the right, it will be seen that the pin 86 is free for movement to the right and that the pin 105 will engage the cam surface 106 of the lever 95, the lever 95 in turn engaging the cam surface 108 of the lever 96 to release the detent 109 from the adjacent end of lever 88 and opening the circuit through contacts 101. However, slightly before the contacts 101 are opened, the contacts 103 are closed, and the signal lamp continues to burn. Subsequent movement of the outer end of arm 54 to the left will return the several levers 88, 95, and 96 to the position shown in Figure 5 wherein it will be seen that the contacts at 101 and 103 are open and the circuit through the signal is broken. Thus, the device is now in the position in which the description of the sequence of operation of the several parts was begun in that the feed for the next feeding operation has been measured and the slide 42 closed shutting off the measuring compartment from the hopper 22.

It will thus be seen that positive interlocking means are provided between the arms 54 and 64 so that if either of the slides 42 or 43 are opened, the other slides are closed there being suitable interlocking means provided so that the device cannot be operated to open both slides 42, 43 and establish direct communication between the hopper 22, the measuring compartment 30 and the several discharge passageways. After the slides 42 have been actuated to their open position and then to their closed position, they cannot again be actuated until the lower slides 43 have been opened and closed. Thus I have provided an apparatus in which a predetermined sequence of steps in measuring and discharging a predetermined amount of feed must be followed in the manner described and because of the interlocking means provided by the lever 80, the pin 86 carried by the arm 54, and the lever 88, the apparatus can only be made to operate in the proper manner.

From the foregoing it will now be apparent that I have provided an improved form of foolproof apparatus for accurately measuring given amounts of feed and for delivering the same at given or predetermined times, or at predetermined intervals to all of the feed troughs 25 for the cages 5 constituting the battery of cages. The feed for each of a plurality of superposed cages is measured at one place above the upper troughs, and the accurately measured amounts of feed are delivered from the feed measuring means so positioned simultaneously to the respective troughs 25. Interference with the delivery of the feed to the respective troughs by packing or changes in volume as the feed passes the successive elevations is prevented, and the apparatus described not only accomplishes the foregoing results, but delivers accurately and individually measured amounts of feed from the same chute to two or more troughs 25 at each elevation. Proper distribution is assured, and the interlock means prevents operation of the apparatus except in the desired sequence.

The switch and circuit arrangement provides for opening the lower slides 43 from any desired position—for example, from remote position within or adjacent the house or dwelling. With such an arrangement, after the apparatus is set for the feeding operation, all that is required is to close the switch 79 to deliver the accurately measured amounts of feed to all of the troughs 25. This switch may be time controlled automatically to open the lower slides 43 to deliver the measured amounts of feed to the various hens at the desired time. If different hens require different amounts of feed, suitable means (not shown) may be provided for individual adjusting the measuring compartments 32.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. In apparatus of the class described, a battery of cages having cages on opposite sides thereof, feed troughs for the respective cages, feed supply chutes on opposite sides of said battery of cages and having feed outlets for delivering feed to the respective troughs, a plurality of vertical passageways in said chutes one for each of said feed outlets, a plurality of feed measuring compartments in each chute above the uppermost troughs there being one measuring compartment for each passageway and trough, upper and lower slides above and below the measuring compartments in each chute and adapted to measure out and deliver the measured amounts of feed for the respective troughs, a pair of arms pivoted at opposite ends of the battery of cages, means interconnecting said upper slides with said arms, a second pair of arms pivoted at opposite ends of the battery of cages, means interconnecting the lower slides with said second pair of arms, and spring means for swinging said lower arms in a direction simultaneously to move the lower slides to open positions, said second arms being operable simultaneously to return the lower slides to closed position, said first arms being adapted for swinging movement in opposite directions to open and close said upper slides.

2. In apparatus of the class described, a battery of cages having cages on opposite sides thereof, feed troughs for the respective cages, feed supply chutes on opposite sides of said battery of cages and having feed outlets for delivering feed to the respective troughs, a plurality of vertical passageways in said chutes one for each of said feed outlets, a plurality of feed measuring compartments in each chute above the uppermost troughs there being one measuring compartment for each passageway and trough, upper and lower slides above and below the measuring compartments in said chutes and adapted to measure out and deliver the measured amounts of feed for the respective troughs, a pair of arms pivoted at opposite ends of the battery of cages, means interconnecting the upper slides with said arms, a second pair of arms pivoted at opposite ends of the battery of cages, means interconnecting the lower slides with said second pair of arms, means for swinging said second arms in a direction simultaneously to move the lower slides to open position, said second arms being operable simultaneously to return the lower slides to closed position, said first arms being adapted for swinging movement in opposite directions to open and close said upper slides, and interlock means adjacent certain of said arms for preventing movement of said upper slides to open position when said lower slides are in open position and preventing movement of said lower slides to open position when said upper slides are in open position.

3. In apparatus of the class described, a battery of cages having cages on opposite sides thereof, feed troughs for the respective cages, feed supply chutes on opposite sides of said battery of cages and having feed outlets for delivering feed to the respective troughs, a plurality of vertical passageways in said chutes one for each of said feed outlets, a plurality of feed measuring compartments in each chute above the uppermost troughs there being one measuring compartment for each passageway and trough, upper and lower slides above and below the measuring compartments in each chute and adapted to measure out and deliver the measured amounts of feed for the respective troughs, a pair of arms pivoted at opposite ends of the battery of cages, means interconnecting the upper slides with said arms, a second pair of arms pivoted at opposite ends of the battery of cages, means interconnecting the lower slides with said second pair of arms, spring means for swinging said lower arms in directions simultaneously to move the lower slides to open position, said second arms being operable simultaneously to return the lower slides to closed position, said first arms being adapted for swinging movement in opposite directions to open and close said upper slides, means for restraining movement of said lower slides to open position, and remote controlled means for releasing said restraining means.

4. In apparatus of the class described, a battery of cages having cages on opposite sides thereof, feed troughs for the respective cages, feed supply chutes on opposite sides of said battery of cages and having feed outlets for delivering feed to the respective troughs, a plurality of vertical passageways in said chutes one for each of said feed outlets, a plurality of feed measuring compartments in each chute above the uppermost troughs there being one measuring compartment for each passageway and trough, upper and lower slides above and below the measuring compartments in each chute and adapted to measure out and deliver the measured amounts of feed for the respective troughs, a pair of arms pivoted at opposite ends of the battery of cages, means interconnecting the upper slides with said pair of arms, a second pair of arms pivoted at opposite ends of said battery of cages, means interconnecting the lower slides with said second pair of arms, means for swinging said second arms in a direction simultaneously to move the lower slides to open position, said second arms being operable simultaneously to return the lower slides to closed position, said first arms being adapted for swinging movement in opposite directions to open and close said upper slides, interlock means adjacent certain of said arms for preventing movement of said upper slides to open position when said lower slides are in open position and for preventing movement of said lower slides to open position when said upper slides are in open position, an electromagnet for restraining movement of said lower slides to open position, and means in circuit with said electromagnet for releasing the restraining action thereof to permit movement of said lower slides to open position.

5. In apparatus of the class described, a feed storage and delivery chute, a feed trough, means for measuring and delivering given amounts of feed from said chute to said trough, a signal means adapted to be rendered operative by the operation of the delivery portion of said means for measuring and delivering a measured amount of feed to said trough but only provided said measuring and delivering means has been actuated to measure the given amount of feed prior to the delivery operation, and means operative only upon completion of a subsequent measuring operation for rendering said signal inoperative.

6. In apparatus of the class described, a feed storage and delivery chute, a feed trough, a feed measuring compartment in said chute below the storage portion, a slide above said compartment and operable to permit the delivery of feed to said compartment, a slide below said compartment and operable to permit delivery of the measured amount of feed to said trough, a signal means adapted to be rendered operative by opening of said lower slide but only when opening of said lower slide is preceded by an opening and closing movement of said upper slide, and means for rendering said signal inoperative upon completion of the opening and closing movement of said upper slide.

7. In apparatus of the class described, a measuring chamber, a supply passage leading to said measuring chamber, a delivery passage leading from said measuring chamber, an upper reciprocatory slide at the top of said chamber, a lower reciprocatory slide at the bottom of said chamber, a first pair of actuating members one beyond each of the opposite ends of said upper slide, a second pair of actuating members one beyond each of the opposite ends of said lower slide, connecting elements between said first actuating members and the opposite ends of said upper slide, additional connecting means between said pair of actuating members for preventing either member of said pair from moving independently of the other member, connecting elements between said second actuating members and the opposite ends of said lower slide, additional connecting means between said pair of actuating members for preventing either member of said pair from moving independently of the other member, and interlock means between one of said first actuating members and one of said second actuating members for preventing simultaneous opening of both slides.

8. In apparatus of the class described, a measuring chamber, a supply passage leading to said measuring chamber, a delivery passage leading from said measuring chamber, an upper reciprocatory slide at the top of said chamber, a lower recoprocatory slide at the bottom of said chamber, a first pair of actuating members one beyond each of the opposite ends of said upper slide, a second pair of actuating members one beyond each of the opposite ends of said lower slide, connecting elements between said first actuating members and the opposite ends of said upper slide, additional connecting means between said pair of actuating members for preventing either member of said pair from moving independently of the other member, connecting elements between said second actuating members and the opposite ends of said lower slide, additional connecting means between said pair of actuating members for preventing either member of said pair from moving independently of the other member, and mechanical interlock means between one of said first actuating members and one of said second actuating members for preventing opening said upper slide when the lower slide is open and also preventing opening of the lower slide when the upper slide is open, the interlock for preventing opening the upper slide when the lower slide is open being set into interlocking position by the actuating means for the lower slide upon positioning said lower slide in open position and released from the actuating means for the lower slide to free the upper slide for opening movement upon resetting the lower slide.

9. In apparatus of the class described, a measuring chamber, a supply passage leading to said measuring chamber, a delivery passage leading from said measuring chamber, an upper reciprocatory slide at the top of said chamber, a lower reciprocatory slide at the bottom of said chamber, a first pair of actuating members one beyond each of the opposite ends of said upper slide, a second pair of actuating members one beyond each of the opposite ends of said lower slide, connecting elements between said first actuating members and the opposite ends of said upper slide, additional connecting means between said pair of actuating members for preventing either member of said pair from moving independently of the other member, connecting elements between said second actuating members and the opposite ends of said lower slide, additional connecting means between said pair of actuating members for preventing either member of said pair from moving independently of the other member, and mechanical interlock means between one of said first actuating members and one of said second actuating members for preventing opening said upper slide when the lower slide is open and also preventing opening said lower slide when the upper slide is open, the interlock means for preventing opening of the lower slide when the upper slide is open being set into interlocking position and released by the operation of one of said actuating members.

10. In apparatus of the class described, a measuring chamber, a supply passage leading to said measuring chamber, a delivery passage leading from said measuring chamber, an upper reciprocatory slide at the top of said chamber, a lower reciprocatory slide at the bottom of said chamber, a first pair of actuating members one beyond each of the opposite ends of said upper slide, a second pair of actuating members one beyond each of the opposite ends of said lower slide, connecting elements between said first actuating members and the opposite ends of said upper slide, additional connecting means between said pair of actuating members for preventing either member of said pair from moving independently of the other member, connecting elements between said second actuating members and the opposite ends of said lower slide, additional connecting means between said pair of actuating members for preventing either member of said pair from moving independently of the other member, interlock means between one of said first actuating members and one of said second actuating members for preventing simultaneous opening of both slides, a signal rendered operative by the operation of delivering a measured amount of feed from said measuring chamber but only provided the given amount of feed has been measured prior to the delivery operation, and means operative only upon completion of a subsequent measuring operation for rendering said signal inoperative.

11. In apparatus of the class described, a battery of cages having at least one cage on one side and at least one cage on the other side, a measuring chamber for the cage on one side, a supply passage leading to said measuring chamber, a delivery passage leading from said chamber, a measuring chamber for the cage on the other side, a supply passage leading to said last mentioned measuring chamber, a delivery passage leading from said last mentioned measuring chamber, a pair of slides for each of said chambers, a pair of actuating members for each of said slides one beyond each of the opposite ends of said battery of cages, first connecting elements between the respective pairs of said actuating members and the opposite ends of the corresponding slide for the measuring chamber at one side of the battery of cages, and second connecting elements between the respective pairs of said actuating members and the opposite ends of the corresponding slide for the measuring chamber at the other side of said battery of cages.

12. In apparatus of the class described, a battery of cages having at least one cage on one side and at least one cage on the other side, a measuring chamber for the cage on one side, a supply passage leading to said measuring chamber, a delivery passage leading from said measuring chamber, a measuring chamber for the cage on the other side, a supply passage leading to said last mentioned measuring chamber, a delivery passage leading from said last mentioned measuring chamber, upper reciprocatory slides one at the top of each of said measuring chambers, lower reciprocatory slides one at the bottom of each of said measuring chambers, a first pair of actuating members one beyond each of the opposite ends of the battery of cages, a second pair of actuating members, one beyond each of the opposite ends of said battery of cages, connecting elements between said first actuating members and the opposite ends of said upper slides, and connecting elements between said second actuating members and the opposite ends of said lower slides.

13. In apparatus of the class described, a battery of cages having at least one cage on one side and at least one cage on the other side, a measuring chamber for the cage on one side, a supply passage leading to said measuring chamber, a delivery passage leading from said measuring chamber, a measuring chamber for the cage on the other side, a supply passage leading to said last mentioned measuring chamber, a delivery passage leading from said last mentioned measuring chamber, upper reciprocatory slides one at the top of each of said measuring chambers, lower reciprocatory slides one at the bottom of each of said measuring chambers, a first pair of actuating members one beyond each of the opposite ends of the battery of cages, a second pair of actuating members, one beyond each of the opposite ends of said battery of cages, connecting elements between said first actuating members and the opposite ends of said upper slides, connecting elements between said second actuating members and the opposite ends of said lower slides, and interlock means between one of said first actuating members and one of said second actuating members for preventing simultaneous opening of both corresponding slides.

14. In apparatus of the class described, a battery of cages having at least one cage on one side and at least one cage on the other side, a measuring chamber for the cage on one side, a supply passage leading to said measuring chamber, a delivery passage leading from said measuring chamber, a measuring chamber for the cage on the other side, a supply passage leading to said last mentioned measuring chamber, a delivery passage leading from said last mentioned measuring chamber, upper reciprocatory slides one at the top of each of said measuring chambers, lower reciprocatory slides one at the bottom of each of said measuring chambers, a first pair of actuating members one beyond each of the opposite ends of the battery of cages, a second pair of actuating members, one beyond each of the opposite ends of said battery of cages, connecting elements between said first actuating members and the opposite ends of said upper slides, connecting elements between said second actuating members and the opposite ends of said lower slides, and mechanical interlock means between one of said first actuating members and one of said second actuating members for preventing opening said upper slides when the lower slides are open and also preventing opening said lower slides when the upper slide is open, the interlock means for preventing opening of the upper slides when the lower slides are open being set into interlocking position by the actuating means for the lower slides upon positioning said lower slides in open position and released from the actuating means for the lower slides to free the upper slides for opening movement upon resetting the lower slides to closed position.

15. In apparatus of the class described, a battery of cages having at least one cage on one side and at least one cage on the other side, a measuring chamber for the cage on one side, a supply passage leading to said measuring chamber, a delivery passage leading from said measuring chamber, a measuring chamber for the cage on the other side, a supply passage leading to said last mentioned measuring chamber, a delivery passage leading from said last mentioned measuring chamber, upper reciprocatory slides one at the top of each of said measuring chambers, lower reciprocatory slides one at the bottom of each of said measuring chambers, a first pair of actuating members one beyond each of the opposite ends of the battery of cages, a second pair of actuating members, one beyond each of the opposite ends of said battery of cages, connecting elements between said first actuating members and the opposite ends of said upper slides, connecting elements between said second actuating members and the opposite ends of said lower slides, and mechanical interlock means between one of said first actuating members and one of said second actuating members for preventing opening said upper slides when the lower slides are open and also preventing opening said lower slides when the upper slides are open, the interlock means for preventing opening of the lower slides when the upper slides are open being set into interlocking position and released by the operation of one of said actuating members.

16. In apparatus of the class described, a battery of cages having at least one cage on one side and at least one cage on the other side, a measuring chamber for the cage on one side, a supply passage leading to said measuring chamber, a delivery passage leading from said measuring chamber, a measuring chamber for the cage on the other side, a supply passage leading to said last mentioned measuring chamber, a delivery passage leading from said last mentioned measuring chamber, upper reciprocatory slides one at the top of each of said measuring chambers, lower reciprocatory slides one at the bottom of each of said measuring chambers, a first pair of actuating members one beyond each of the opposite ends of the battery of cages, a second pair of actuating members, one beyond each of the opposite ends of said battery of cages, connecting elements between said first actuating members and the opposite ends of said upper slides, connecting elements between said second actuating members and the opposite ends of said lower slides, interlock means between one of said first actuating members and one of said second actuating members for preventing simultaneous opening of both slides, a signal rendered operative by the operation of delivering a measured amount of feed from said measuring chamber but only provided the given amount of feed has been measured prior to the delivery operation, and means operative only upon completion of a subsequent measuring operation for rendering said signal inoperative.

17. In apparatus of the class described, a battery of cages having cages on opposite sides thereof, feed troughs for the respective cages some disposed above the others thereof, feed supply chutes on opposite sides of said battery of cages and having feed outlets for delivering feed to the respective troughs, a plurality of vertical passageways in said chutes one for each of said feed outlets, a plurality of feed measuring compartments in each chute above the uppermost troughs there being one measuring compartment for each passageway and trough, reciprocatory slides for said measuring compartments, a pair of arms for each of said slides pivoted at opposite ends of the battery of cages, and means interconnecting said slides with said arms for actuating said slides to open and closed positions by pivotal movement of said arms.

WESTROPP ARMSTRONG.

CERTIFICATE OF CORRECTION.

Patent No. 2,339,043.   January 11, 1944.

WESTROPP ARMSTRONG.

It is hereby certified that error appears in the printed specification of the above numbered patent requiring correction as follows: Page 8, first column, line 2, claim 13, for "corresponding" read --pairs of--; and that the said Letters Patent should be read with this correction therein that the same may conform to the record of the case in the Patent Office.

Signed and sealed this 18th day of April, A. D. 1944.

Leslie Frazer (Seal)   Acting Commissioner of Patents.